US008654376B2

(12) United States Patent
Honda

(10) Patent No.: US 8,654,376 B2
(45) Date of Patent: Feb. 18, 2014

(54) PRINTING SYSTEM, INFORMATION PROCESSING APPARATUS, AND PRINTING APPARATUS, AND CONTROL METHOD AND PROGRAM FOR THE SAME

(75) Inventor: Kinya Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 725 days.

(21) Appl. No.: 12/577,100

(22) Filed: Oct. 9, 2009

(65) Prior Publication Data

US 2010/0110482 A1    May 6, 2010

(30) Foreign Application Priority Data

Nov. 6, 2008 (JP) ................................ 2008-285708

(51) Int. Cl.
*G06F 3/12* (2006.01)
*G06K 15/00* (2006.01)

(52) U.S. Cl.
USPC ........ 358/1.15; 358/1.13; 358/1.18; 358/3.31

(58) Field of Classification Search
USPC ....................................................... 358/1.15
See application file for complete search history.

(56) References Cited

U.S. PATENT DOCUMENTS

| 4,085,445 | A | * | 4/1978 | Blevins et al. | ............... | 358/1.18 |
| 5,104,245 | A | * | 4/1992 | Oguri et al. | ..................... | 400/68 |
| 7,556,247 | B1 | * | 7/2009 | Delfer et al. | ................. | 270/21.1 |
| 2002/0018227 | A1 | * | 2/2002 | Asahi | ........................... | 358/1.13 |
| 2005/0141942 | A1 | * | 6/2005 | Someno | ......................... | 400/76 |
| 2006/0050879 | A1 | * | 3/2006 | Iizuka | ............................ | 380/51 |
| 2007/0146791 | A1 | * | 6/2007 | Murase | ....................... | 358/1.16 |

FOREIGN PATENT DOCUMENTS

JP            2004-288032         10/2004

* cited by examiner

*Primary Examiner* — Huo Long Chen
(74) *Attorney, Agent, or Firm* — Fitzpatrick, Cella, Harper & Scinto

(57) ABSTRACT

A printing apparatus receives a print job from an information processing apparatus. It is determined whether the received print job is a first print job or a second print job. If the results of the determination indicate that the received print job is a first print job, printing onto a printing medium is executed based on the first print job. However, if the received print job is a second print job, the second print job is stored in a storage medium. Then, if a printing instruction for printing the second print job containing printing settings and stored in the storage medium has been made, printing based on the second print job is executed onto a printing medium onto which printing based on the first print job has already been executed, and a process for adding a processing agent to that printing medium is then executed.

3 Claims, 10 Drawing Sheets

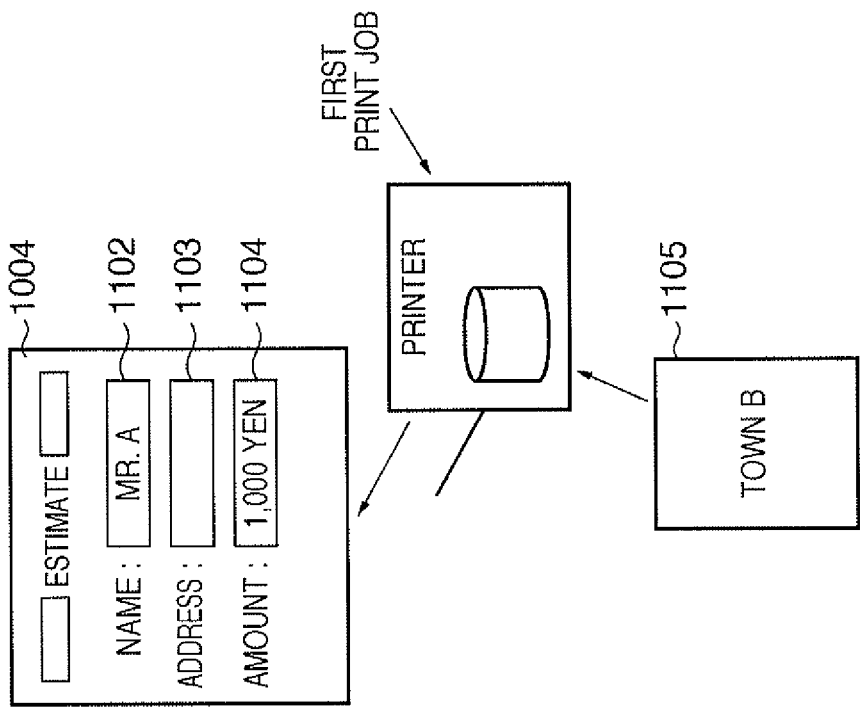
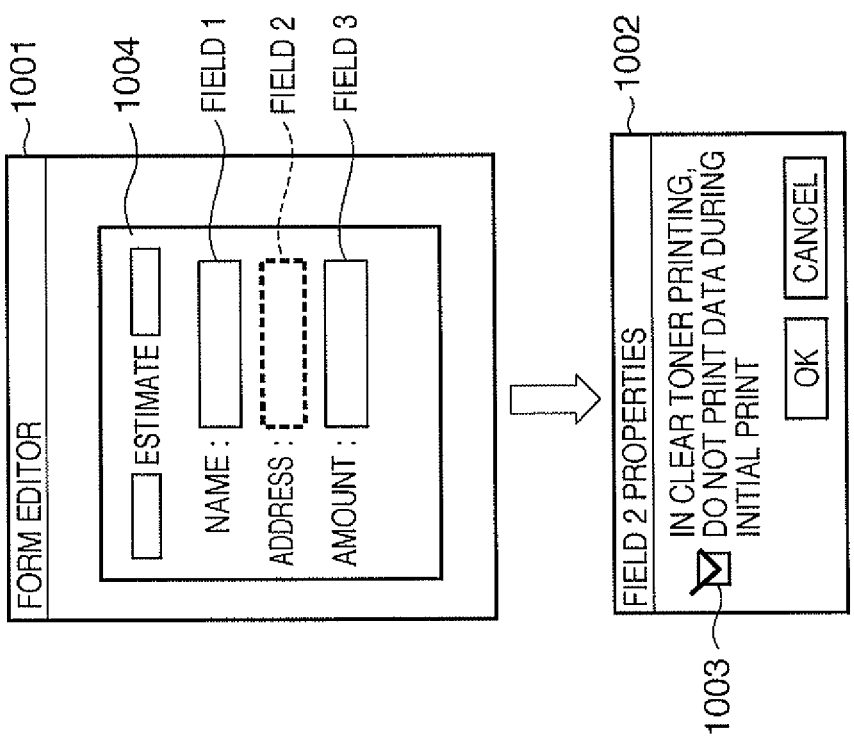

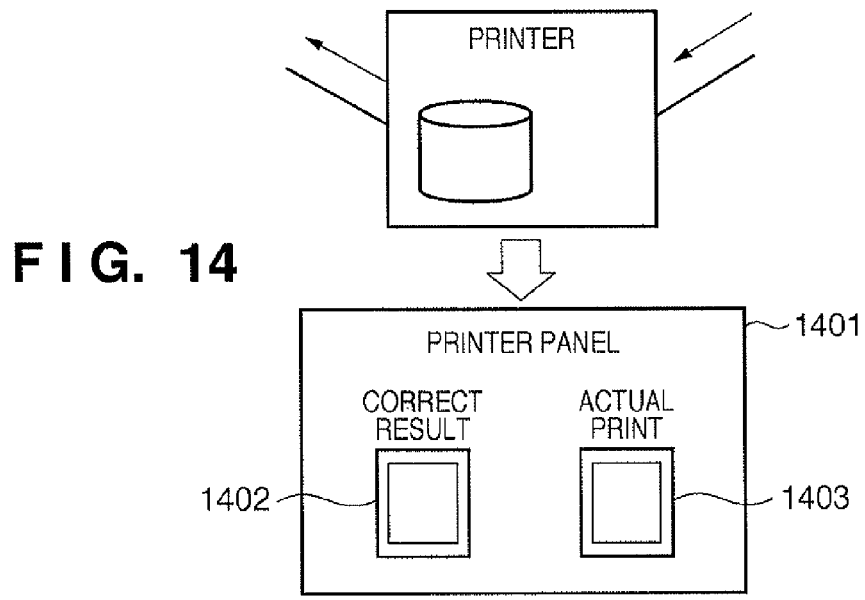
FIG. 14
FIG. 15
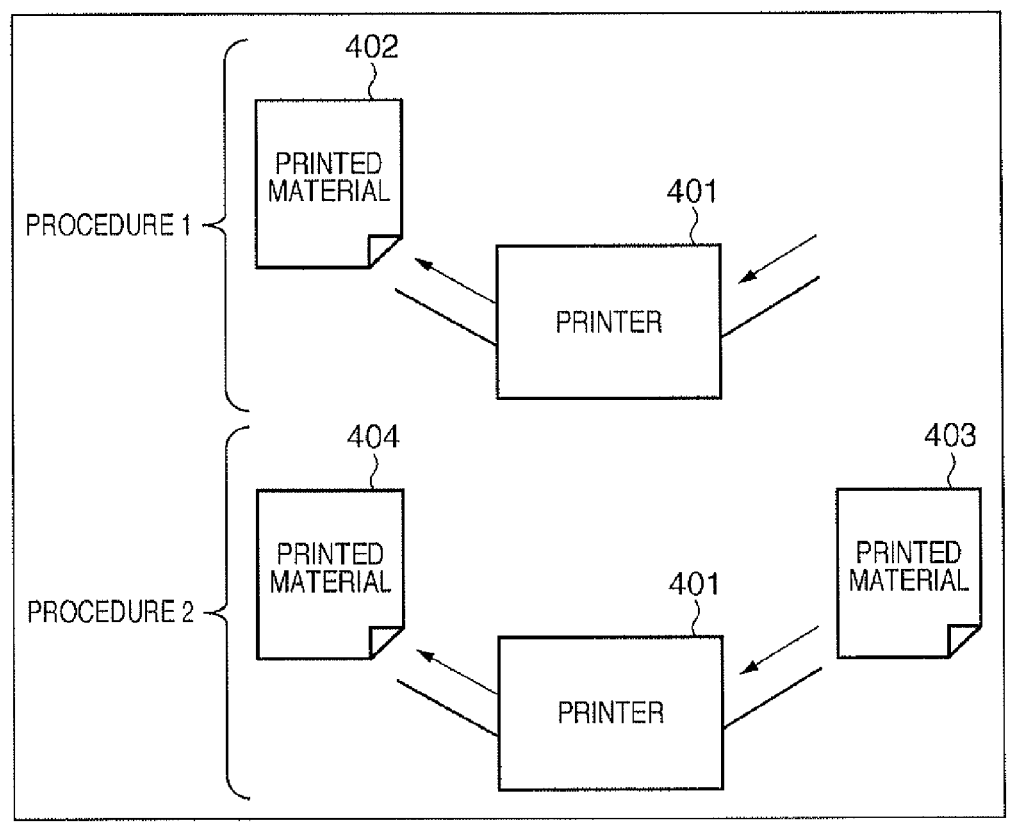

PRINTING SYSTEM, INFORMATION PROCESSING APPARATUS, AND PRINTING APPARATUS, AND CONTROL METHOD AND PROGRAM FOR THE SAME

BACKGROUND OF THE INVENTION

1. Field of the Invention

The present invention relates to a printing system provided with an information processing apparatus that generates a print job to be supplied to a printing apparatus and a printing apparatus that executes printing based on the print job received from the information processing apparatus.

2. Description of the Related Art

When overlaying (adding) clear toner on (to) printed material, there is a limit on how much clear toner can be added to the printed material, and thus there are cases where the amount of clear toner added is influenced by the amount of CMYK used (printing amount), which results in unevenness in the print. To prevent this, a method such as that shown in FIG. 15 has been proposed. In the example in FIG. 15, normal printing (that is, printing using the basic CMYK color toner) is executed during the initial print, and printed material 402 is generated by a printer 401 as a result. Next, the printed material 402 is sufficiently dried. The sufficiently-dried printed material 403 is then set in the printer 401 once again, and by adding clear toner during a second print, a clear toner-coated printed material 404 is generated by the printer 401.

However, image irregularities such as air bubbles and cracking will occur in such a case unless the clear toner is added after the heat on the surface of the paper, arising during the fixing process in the initial printing (that is, printing using the basic CMYK color toner), has cooled. For this reason, it is necessary to sufficiently dry the printed material 402 before adding the clear toner thereto.

When printing forms such as insurance forms and the like, the following issues arise if such forms are printed with clear toner using the method mentioned above. When printing insurance forms and the like using a variable printing system, which customizes documents on a client-by-client basis (described later), personal information such as names, addresses, and the like are included as variable data. In the example shown in FIG. 15, there are cases where important personal information is present in the initial printed material 402. However, it is necessary to dry the initial printed material 402 in order to add clear toner thereto in the aforementioned method. Furthermore, in order to prevent unevenness caused by the amount of CMYK used (printing amount) influencing the amount of clear toner added, it is necessary to print the initial printed material 402 without adding clear toner.

In other words, while it is necessary to output printed materials containing personal information, there is a chance that this personal information will be seen by a third party, or in other words, a chance that privacy cannot be protected, information will be leaked, and so on. Meanwhile, in this type of variable printing system, there is demand for the creation of customized documents in which content, the amount of which differs on the client-by-client basis, is optimally laid out.

Here, in a variable printing system, containers, which are rendering regions for rendering content (that is, content to be rendered (for example, images, text, and the like)), are laid out within a document. Next, in a variable printing system, operations for associating a database and a layout with one another (that is, associating various types of content within a database with containers) are carried out. Through this, a desired customized document (called a "document template") can be created. By switching the content within the containers in this customized document as appropriate (that is, altering associations), the details thereof can be made variable. Therefore, such a document is called a "variable data document", and the printing systems that use such variable data documents are called "variable printing systems".

With respect to the problem that personal information may be seen by a third party, a method for storing and managing print jobs in a printer as held jobs exists as a known technique. For example, Patent Document 1 (Japanese Patent Laid-Open No. 2004-288032) proposes storing and managing print jobs in a printer or the like as jobs on hold, for cases in which printing could not be carried out, due to the supply of staples being exhausted or the like.

However, even with Patent Document 1, there is still the condition that it is necessary to dry the initial printed material, and thus it is necessary to output the printed material during the initial print. Furthermore, it is also necessary to output printed material during the initial print in order to prevent unevenness.

SUMMARY OF THE INVENTION

The present invention has been conceived in order to solve at least one of the aforementioned problems. That is, the present invention provides a printing system, an information processing apparatus, a printing apparatus, and a control method and program for the same, that are capable of providing a safe printing environment in which the likelihood of important information in printed material being leaked is reduced.

According to the first aspect of the present invention, a printing system provided with an information processing apparatus that generates print jobs to be supplied to a printing apparatus and a printing apparatus that executes printing based on the print jobs received from the information processing apparatus, the information processing apparatus comprises: a generation unit adapted to generate, from print data for overlay printing containing form information and data information, wherein the printing data includes printing settings for adding a processing agent to a printing medium, a first print job for performing printing using the form information and a second print job for performing printing using the data information including the printing settings; and a transmission unit adapted to transmit the print jobs generated by the generation unit to the printing apparatus, and the printing apparatus comprises: a reception unit adapted to receive the print jobs from the information processing apparatus; a printing unit adapted to print onto a printing medium based on the print jobs; a determination unit adapted to determine whether a print job received by the reception unit is the first print job or the second print job; a control unit adapted to execute printing onto a printing medium using the printing unit based on the first print job in the case where the result of the determination performed by the determination unit indicates that the print job received by the reception unit is the first print job, and store the second print job in a storage medium in the case where the result of the determination performed by the determination unit indicates that the print job received by the reception unit is the second print job; and a print processing unit adapted to execute, based on the second print job and using the printing unit, printing onto a printing medium that has been printed onto by the printing unit based on the first print job in the case where the second print job containing the printing settings and stored in the storage medium has been instructed to be printed, and execute a process for adding the processing agent to that printing medium.

According to the second aspect of the present invention, an information processing apparatus that generates print jobs to be supplied to a printing apparatus, the information processing apparatus comprising: a generation unit adapted to generate, from print data for overlay printing containing form information and data information, wherein the print data includes printing settings for adding a processing agent to a printing medium, a first print job for performing printing using the form information and a second print job for performing printing using the data information including the printing settings; and a transmission unit adapted to transmit the print jobs generated by the generation unit to the printing apparatus.

According to the third aspect of the present invention, a printing apparatus that receives print jobs from an information processing apparatus that generates, from print data for overlay printing containing form information and data information, wherein the print data includes printing settings for adding a processing agent to a printing medium, a first print job for performing printing using the form information and a second print job for performing printing using the data information including the printing settings, and executes printing based on the received print jobs, the printing apparatus comprising: a reception unit adapted to receive the print jobs from the information processing apparatus; a printing unit adapted to print onto a printing medium based on the print jobs; a determination unit adapted to determine whether a print job received by the reception unit is the first print job or the second print job; a control unit adapted to execute printing onto a printing medium using the printing unit based on the first print job in the case where the result of the determination performed by the determination unit indicates that the print job received by the reception unit is the first print job, and store the second print job in a storage medium in the case where the result of the determination performed by the determination unit indicates that the print job received by the reception unit is the second print job; and a print processing unit adapted to execute, based on the second print job and using the printing unit, printing onto a printing medium that has been printed onto by the printing unit based on the first print job in the case where the second print job containing the printing settings, stored in the storage medium, has been instructed to be printed, and execute a process for adding the processing agent to that printing medium.

Further features of the present invention will be apparent from the following description of exemplary embodiments with reference to the attached drawings.

BRIEF DESCRIPTION OF THE DRAWINGS

FIG. 10 is a diagram illustrating an example of the application of the first embodiment of the present invention.

FIG. 11 illustrates an example of operations using the form illustrated in FIG. 10 according to the first embodiment of the present invention.

FIG. 14 is a diagram illustrating an example according to a third embodiment of the present invention.

FIG. 15 is a diagram illustrating a conventional technique.

DESCRIPTION OF THE EMBODIMENTS

A embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<System Configuration Diagram>

First, a printing system applicable in the embodiments described below and the hardware configuration of a host computer (information processing apparatus) serving as a constituent element thereof shall be described using FIG. 1 and FIG. 2.

Figure 1:
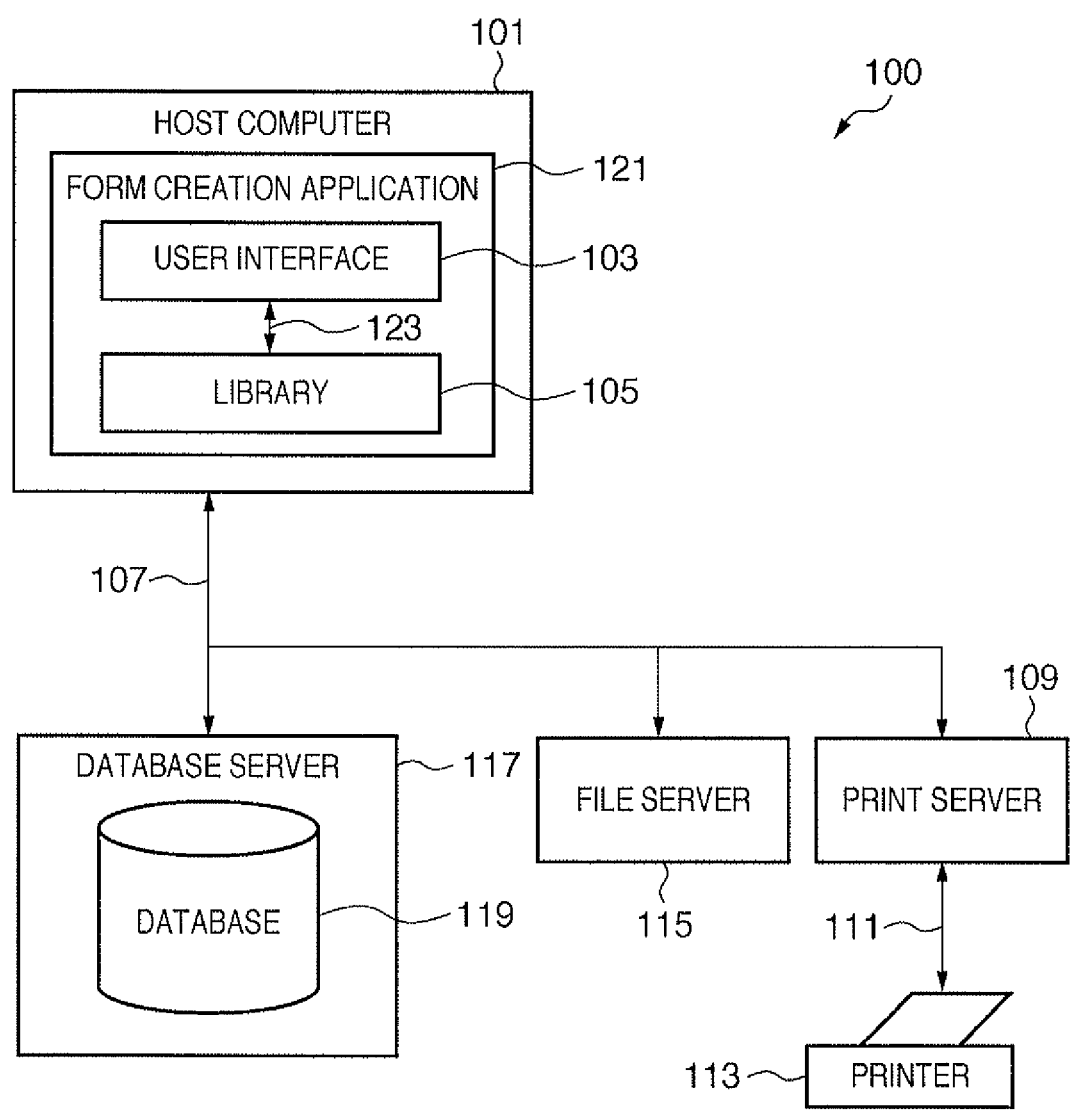
FIG. 1 is a diagram illustrating an example of the configuration of a printing system according to the present invention.

FIG. 1 is a diagram illustrating an example of the configuration of a printing system according to the present invention. Meanwhile, FIG. 2 is a diagram illustrating the hardware configuration of a host computer serving as a constituent element of the printing system according to the present invention.

Figure 2:
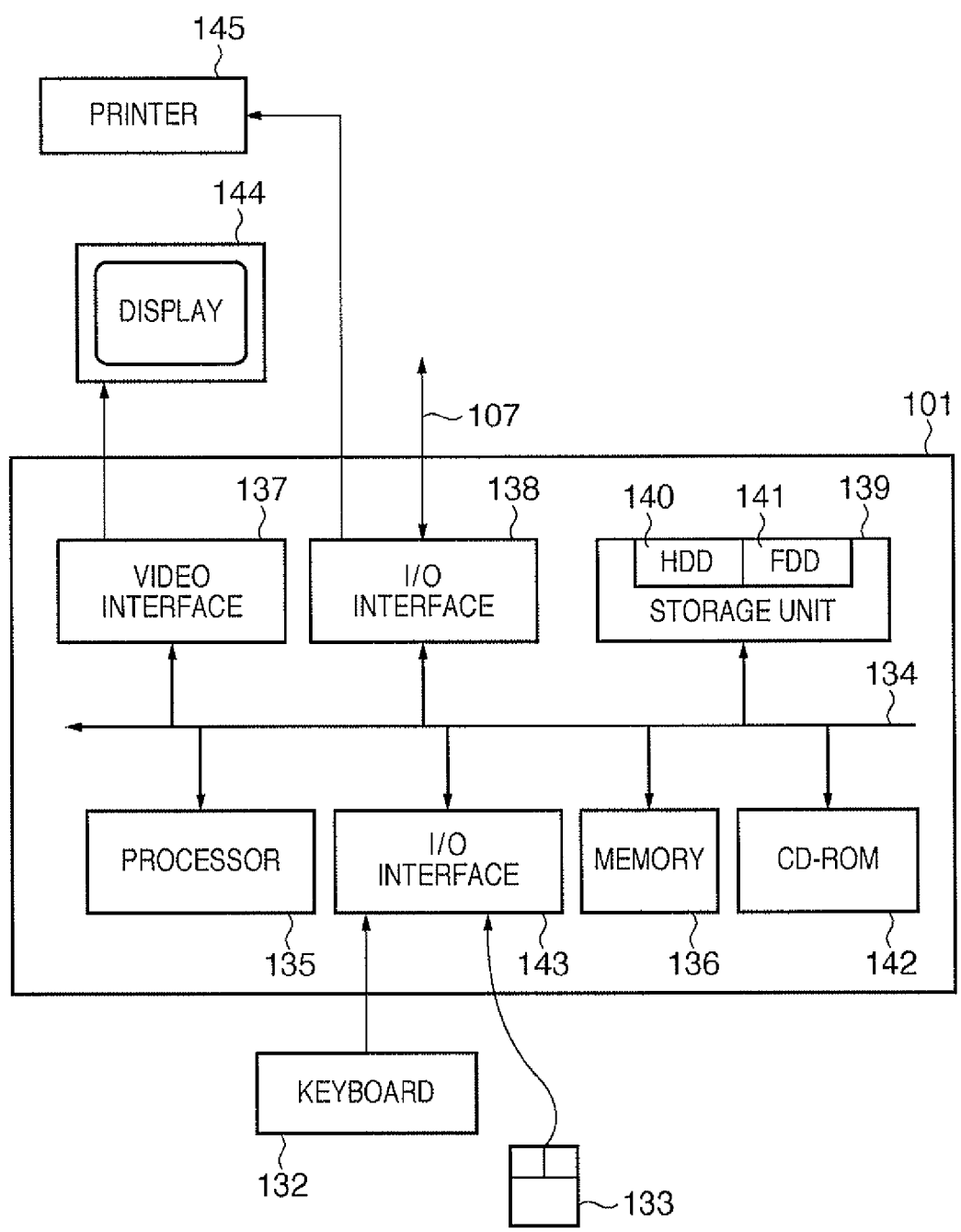
FIG. 2 is a diagram illustrating the hardware configuration of a host computer serving as a constituent element of the printing system according to the present invention.

Note that the various other computers aside from the host computer 101 shown in FIG. 1 (for example, a database server 117, a file server 115, and a printing server 109) may also have the same hardware configurations as, for example, the hardware configuration illustrated in FIG. 2.

In a printing system 100 illustrated in FIG. 1, the host computer 101, the database server 117, the file server 115, and the printing server 109 are connected to one another via a network 107.

The database server 117 includes a database 119. Meanwhile, the printing server 109 is connected to a printer (printing unit) 113, and is capable of outputting print data received via the network 107 to the printer 113 as appropriate and causing that print data to be printed.

Note that the printer 113, serving as a printing apparatus, is a printer that performs printing according to a laser beam system that uses, for example, toner as its recording agent. In addition to a printer engine for performing printing according to a normal laser beam system, the printer 113 also has a mechanism for adding clear toner to a printing medium.

The printing system 100 is an example of a variable printing system that prints variable data documents. The variable printing processing is implemented by the host computer 101 (configured of a generic computer module) functioning as a form creation apparatus.

As shall be mentioned later, this form creation apparatus is capable of performing a dynamic layout process that dynamically determines, at the time of variable output (printing or displaying a print preview), the location and size of various containers in accordance with the amount/size of the content and restrictions due to the associations set to each container.

A form creation application 121, capable of being run by the printing system 100, is partially or completely executed by the host computer 101. In particular, processing regarding layout editing, editing of configuration files, processing regarding the printing of variable data documents, and so on are realized through software executed by the host computer 101.

Software such as the form creation application 121 and computer programs are stored in a computer-readable medium, and are loaded into a memory 136 of the host computer 101 from that computer-readable medium and executed. Such a computer-readable medium is an example of a computer program product. Using, for example, that computer program product in the host computer 101 thus provides an apparatus capable of being used for the layout editing of variable data documents, variable printing, and the like.

As shown in FIG. 2, a keyboard 132, a mouse 133 serving as a pointing device, and so on are connected to the host computer 101 as input devices via an I/O (input/output) interface 143. A display 144 is also connected to the host computer 101 as an output device via a video interface 137. Furthermore, a printer 145 can also be connected to the host computer 101 via an I/O interface 138.

The I/O interface 138 also has functionality for connecting the host computer 101 to the network 107. Through this, the host computer 101 can be connected to other computer devices (external devices) within the printing system 100 via the network 107. A local area network (LAN) or a wide area network (WAN) can be given as typical examples of the network 107.

Furthermore, as shown in FIG. 2, the host computer 101 includes at least one processor 135 as well as the memory 136, which is a semiconductor memory, and is, for example, configured of a random access memory (RAM), a read-only memory (ROM), or the like. A storage device 139 includes a hard disk drive (HDD) 140, a Floppy® disk drive (FDD) 141, or the like capable of exchanging data with a computer-readable medium that stores various data such as programs. A CD-ROM drive 142 provides a non-volatile data source (of course, computer programs may be supplied by CD-ROM).

Although not shown in FIG. 2, note that it is also possible to use various other types of storage devices, such as magnetic tape drives, memory cards, or the like, as the storage unit 139.

The host computer 101 communicates with the various constituent elements 135 to 143 therein via an interconnected bus 134. This communication is typically performed in accordance with an operating system, such as, for example, GNU/Linux or Microsoft Windows®. Alternatively, this communication is performed using a conventional operation mode in a computer system configured of related known technologies. In other words, the aforementioned various constituent elements 135 to 143 are communicably connected via the interconnected bus 134, and are used by an operating system installed in the host computer 101.

Note that an IBM-compatible PC (personal computer), the SPARCstation by Sun, or a computer system that includes such a computer can be considered as an example of the host computer 101 shown in FIG. 2.

The form creation application 121 in FIG. 1 is held in the hard disk drive 140, and the execution, loading, and so on thereof is controlled by the processor 135. An intermediary storage device of the form creation application 121 and data fetched from the network 107 use the memory 136 in concordance with the hard disk drive 140.

In one example, a program in which the form creation application 121 has been encoded is stored in a CD-ROM, a Floppy® disk, or the like. That program is then loaded through the corresponding CD-ROM drive 142, Floppy® disk drive 141, or the like, and is installed in the hard disk drive 140.

Alternatively, as another example, the form creation application 121 may be loaded into the host computer 101 from the network 107 and installed in the hard disk drive 140.

Furthermore, various software containing the form creation application 121 may be loaded into the host computer 101 from another appropriate external resource. Magnetic tape, a ROM, an integrated circuit, and a magneto-optical disk are examples of such external resources. Furthermore, wireless communication between the host computer 101 and another device, such as infrared communication, computer-readable cards such as PCMCIA cards, and so on are also examples of such external resources. Finally, the Internet, intranets, and so on that carry e-mail communications, information recorded in websites, and so on are also examples of such external resources. Such external resources are examples of computer-readable media, and thus it should be clear that other computer-readable media may be used as well.

In FIG. 1, the form creation application 121 causes the host computer 101 to execute form creation, printing, and furthermore, variable printing. This form creation application 121 contains two software components; namely, a library 105 and a user interface 103.

The library 105 is the software component that executes processes such as overlay printing processing. The library 105 is also the software component that executes the processing used to implement variable printing. To be more specific, the library 105 reads out one record at a time from variable data stored in the database 119 on a record-by-record basis, in accordance with the size and location restrictions placed on containers (rectangular ranges) serving as field regions (partial regions). Then, based on the loaded variable data and the container restrictions, the library 105 computes the layout, or in other words the size, location, and so on of the containers into which the loaded variable data is to be inserted.

The library 105 furthermore performs a process for rendering variable data assigned to a container, thereby generating an image of a variable data document. However, the present invention is not limited thereto. For example, the configuration may be such that the library 105 operates as an application that determines the size and location of each partial region (container), outputting rendering information to a printer driver (not shown). In this case, the printer driver may perform the process for rendering the image of the variable data document, thereby generating print data.

The user interface 103 provides a mechanism that allows a user to create forms, settings files, and the like. The user interface 103 also enables the user to configure the layout, attributes, and so on of containers, thereby allowing the user to create a document template (also called "template information"). Furthermore, the user interface 103 provides a mechanism for associating the containers within a document template with a database (that is, variable data within the database 119 (content)). The user interface 103 and the library 105 communicate via a communication channel 123.

The database 119, which is a typical database in the database server 117 configured of another computer running a database application, can be given as a general example of the data source for generating a variable data document.

The host computer 101 communicates with the database server 117 via the network 107. The form creation application 121 generates forms and settings files, and furthermore generates document templates, that are stored in the host computer 101 or in the file server 115, which is generally configured of another computer.

Furthermore, the form creation application 121 generates documents in accordance with forms. The form creation application 121 also generates variable data documents configured of document templates merged with variable data. These documents, variable data documents, and so on are printed directly by the printer 113, via the local file system of the host computer 101, the file server 115, or the printing server 109.

Here, the printing server 109 is a computer that provides network functionality to the printer 113, which is not directly connected to the network 107. The printing server 109 and the printer 113 are connected by a typical communication channel 111 (for example, USB, IEEE 1394, wireless LAN, or the like).

Next, a different example of the configuration of the printing system 100 shall be described with reference to FIG. 3.

Figure 3:
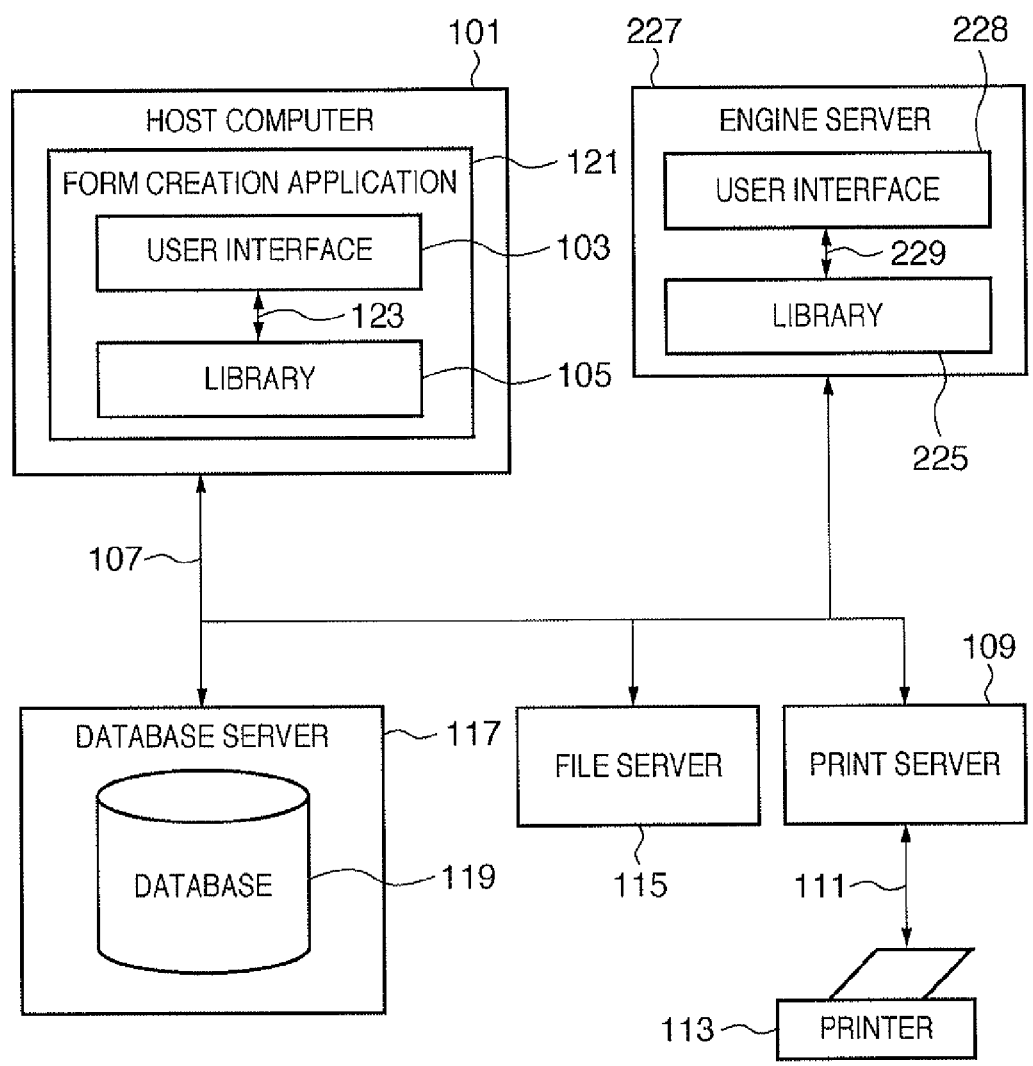
FIG. 3 is a diagram illustrating another example of the configuration of a printing system according to the present invention.

FIG. 3 is a diagram illustrating another example of the configuration of a printing system according to the present invention.

FIG. 3 illustrates an example of a configuration in which an engine server 227 has been added on the network 107, the engine server 227 being configured of a library 225 and a user interface 228. In other words, in this configuration, the library 105 and the user interface 103 within the host computer 101 are implemented within the engine server 227. Such a configuration can reduce the processing load on the host computer 101.

Note that the engine server 227 is, like the other servers, a typical computer. Furthermore, forms stored in the file server 115 can, when those forms are to be printed or used for another purpose, be linked to data stored in the database 119 for the library 225 to generate documents. Such an operation is implemented by making a request via the user interface 103 or giving an instruction to the library 225 via the user interface 228.

Next, an example of a form created by the form creation application 121 shall be described with reference to FIG. 4.

Figure 4:
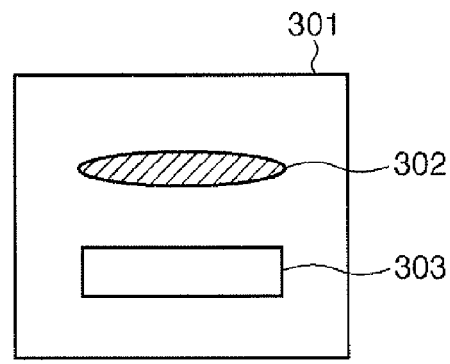
FIG. 4 is a diagram illustrating an example of a form created using a form creation application according to the present invention.

FIG. 4 is a diagram illustrating an example of a form created using the form creation application according to the present invention.

A form 301, which is print data for forming an image upon a printing medium, is configured of two types of graphics. The first is a fixed graphic This is a graphic that, when printed, is printed as a fixed shape, regardless of the variable data that is loaded as the added data. The second is a field 303. This is a region into which variable data is loaded during overlay printing as the added data.

The reason that the conventional printing method for adding clear toner goes through two printing processes is that there is a chance that the amount of clear toner added will be influenced by the amount of CMYK used, resulting in unevenness in the print. However, personal information such as addresses and the like printed in printed materials is text-based, and in simple text-based printing, a low amount of CMYK is used. Accordingly, based upon this concept, the present invention adds clear toner according to the following procedure, illustrated in FIG. 5.

Figure 5:
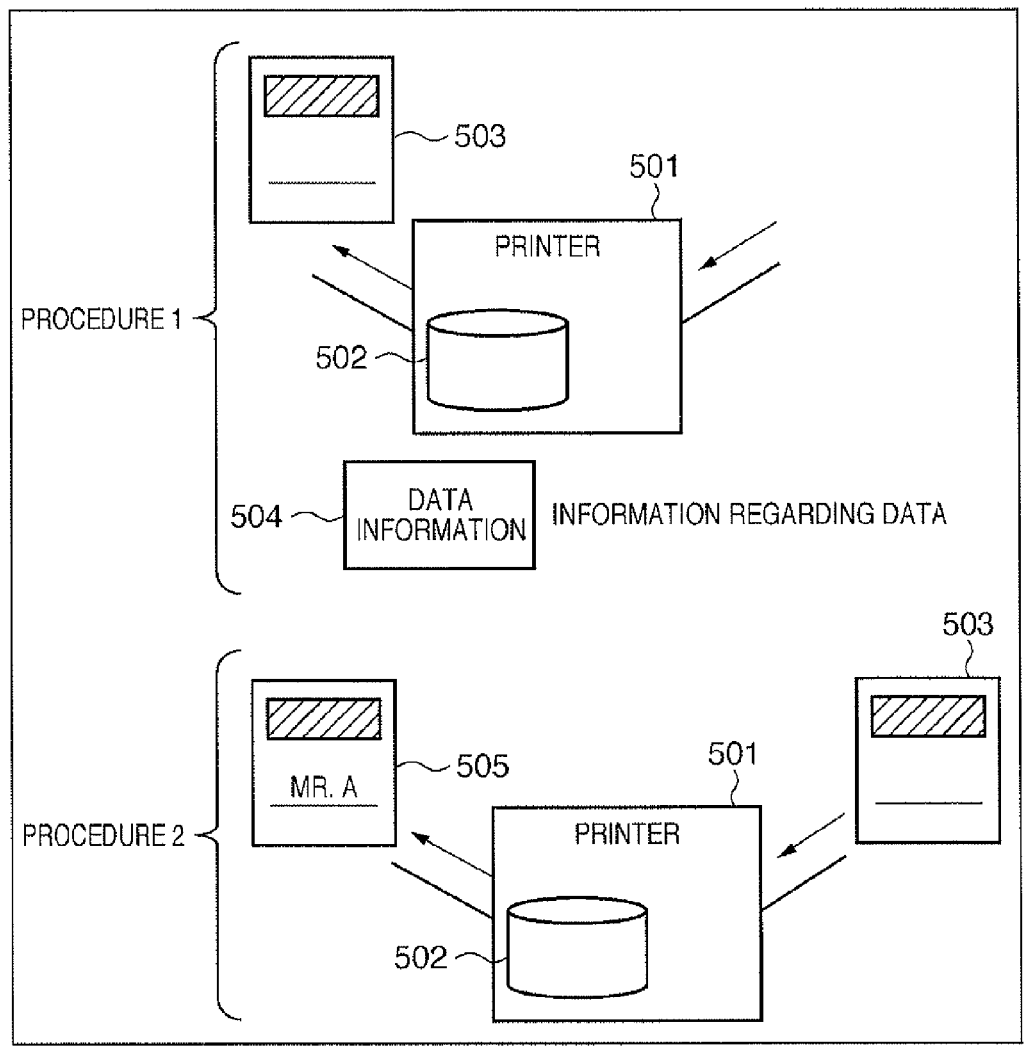
FIG. 5 is a diagram illustrating a printing method according to the present invention.

FIG. 5 is a diagram illustrating a printing method according to the present invention.

Procedure 1) First, printing that does not include variable data is executed by a printer 501 according to the normal printing procedure (that is, using the CMYK base colors), thereby generating a printed material 503. At this point in time, storage control for storing variable data 504 in an internal database 502 of the printer 501 is executed.

Procedure 2) During the second print, the clear toner printing is executed by the printer 501 with the variable data 504, thereby generating a printed material 505.

First Embodiment

Figure 6:
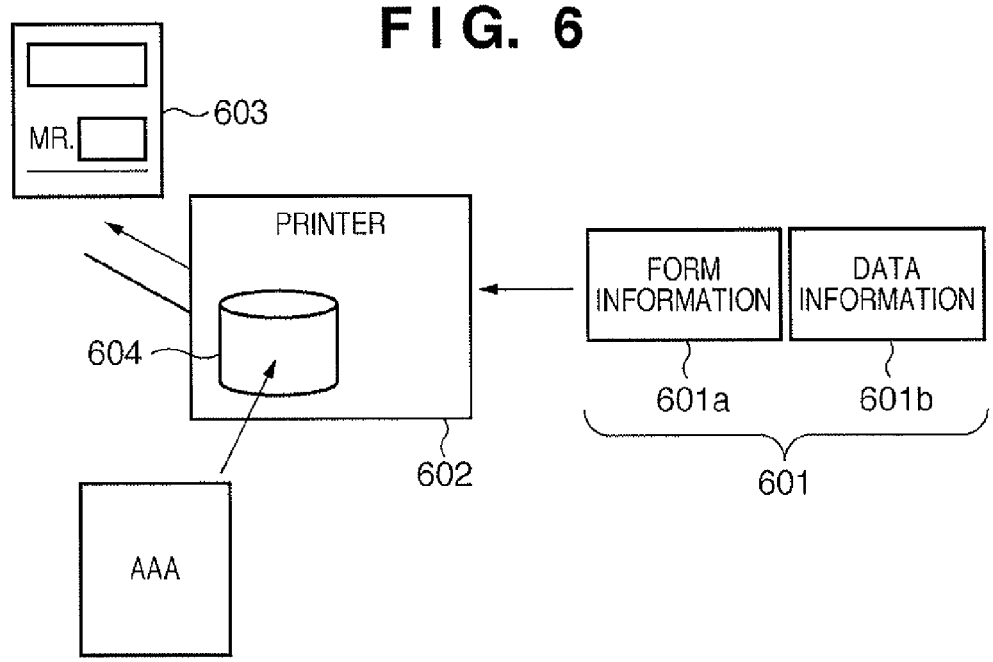
FIG. 6 is a diagram illustrating an example of procedures leading up to the initial (first) print according to a first embodiment of the present invention.
Figure 7:
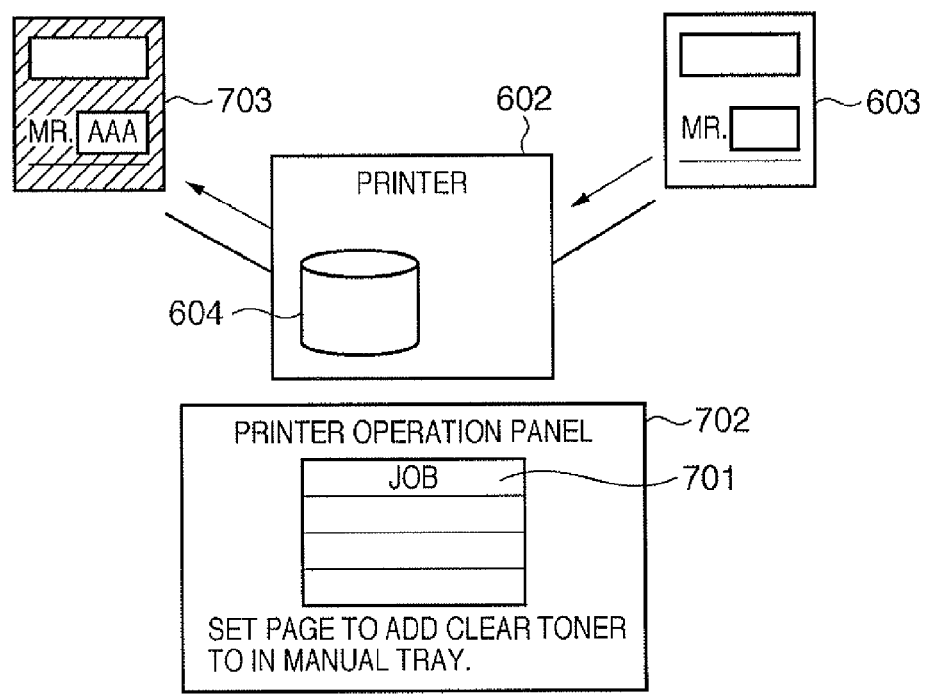
FIG. 7 is a diagram illustrating an example of procedures leading up to the second print according to the first embodiment of the present invention.

Next, a first embodiment of the present invention shall be described using the specific examples illustrated in FIGS. 6 and 7.

FIG. 6 is a diagram illustrating an example of procedures leading up to the initial (first) print according to the first embodiment of the present invention, and FIG. 7 is a diagram illustrating an example of procedures leading up to the second print according to the first embodiment of the present invention.

First, in FIG. 6, when a job 601 for adding clear toner is specified by a user, the library 225 analyzes overlay printing data containing form information and field information used during overlay printing. Then, only the data of fields into which text is to be inserted is split into a different job. In other words, the following two jobs, or a first job and a second job, are generated.

form information job: job 601a
variable data (text) information job: job 601b

Next, a printer 602 receives the two jobs 601a and 601b and prints only the form information job (the job 601a), thereby outputting a printed material 603. Meanwhile, the variable data (text) information job (the job 601b) is stored in a hard disk 604 within the printer 602. At this time, the printer 602 stores the job 601b as a single print job. After this, the user dries the initial printed material 603.

Next, as shown in FIG. 7, after sufficiently drying the initial printed material 603, the user selects a job 701, which is the job 601b within the hard disk 604, using an operation panel 702 of the printer 602. When a print job for adding clear toner, as specified by the job 701, is selected, the printer 602 displays, in the operation panel 702 of the printer 602, a message prompting the user to set the initial printed material 603 in the printer 602.

The user confirms this message and sets the initial printed material 603 in the printer 602. The printer 602 loads the printed material 603 and first prints the stored variable data (text) information job 601b. After that, the printer 602 adds (prints) the clear toner, and outputs a printed material 703.

Note that the operation panel 702 is configured of, for example, a touch panel; the operation panel 702 displays the jobs currently stored within the printer as a list, and the user can select a desired job from that list and execute instructions for that job to be printed.

Figure 8:
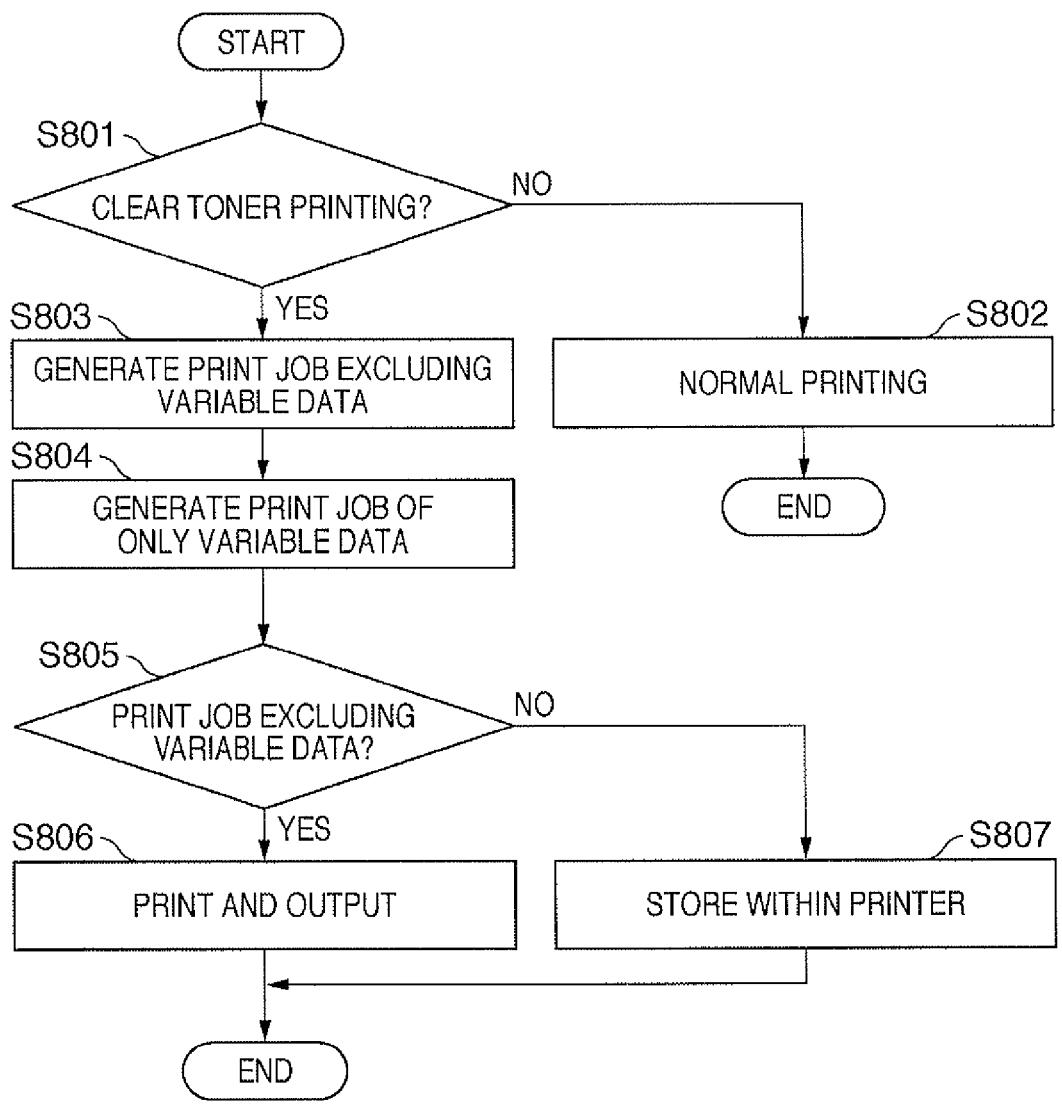
FIG. 8 is a flowchart illustrating the processing of the initial print according to the first embodiment of the present invention.
Figure 9:
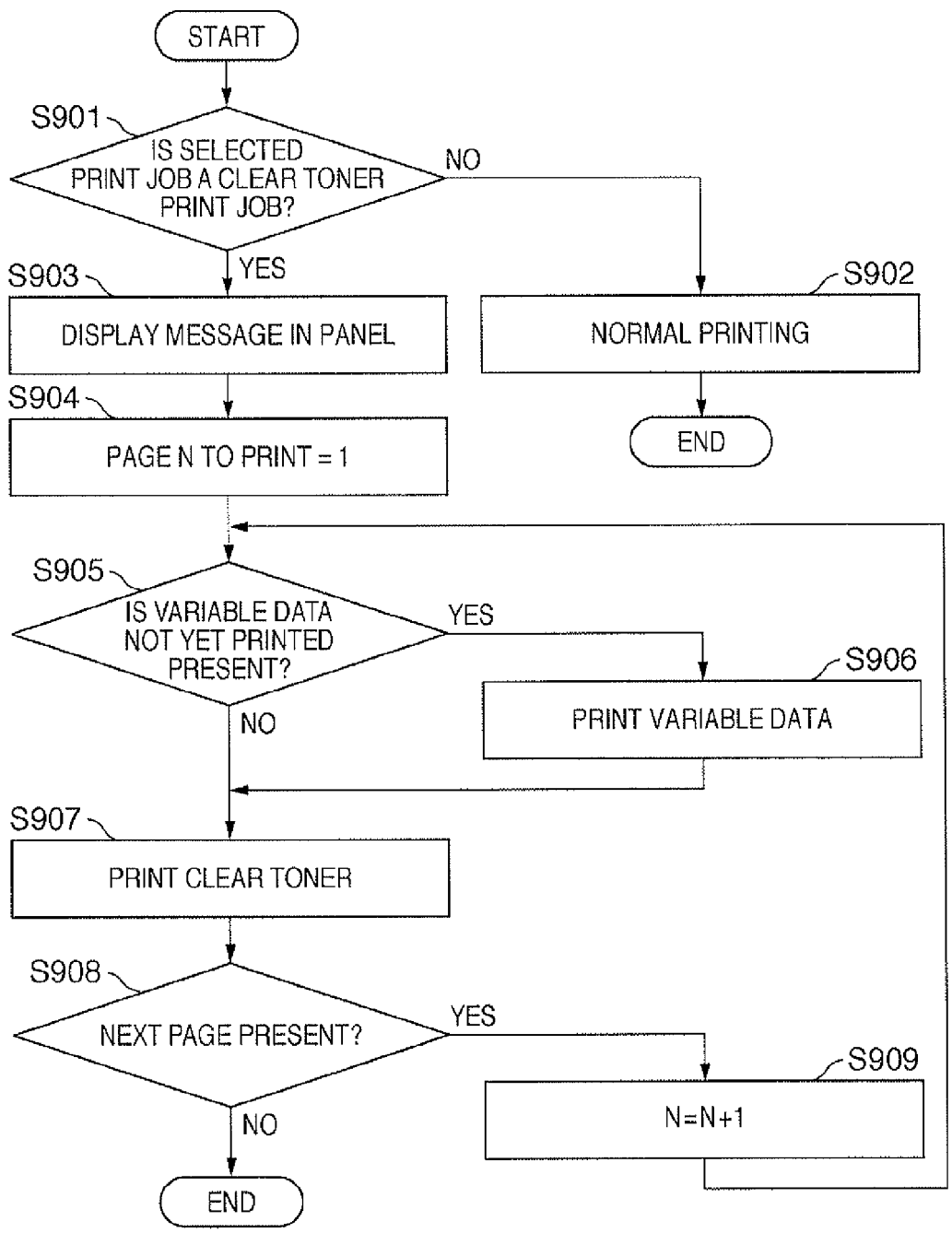
FIG. 9 is a flowchart illustrating the processing of the second print according to the first embodiment of the present invention.

Next, a flowchart illustrating the printing process executed in the first embodiment shall be described using FIGS. 8 and 9. FIG. 8 is a flowchart illustrating the processing of the initial print according to the first embodiment of the present invention. FIG. 9, meanwhile, is a flowchart illustrating the processing of the second print according to the first embodiment of the present invention. Note that the processing in these flowcharts is implemented by a CPU in the host computer or the printer reading out a program related to the processing of the present invention from a memory and executing that program.

First, the processing of the initial print shall be described using FIG. 8. In FIG. 8, steps S801 to S804 are processes executed by the host computer 101, whereas steps S805 to S807 are processes executed by the printer 113.

In step S801, the library 225 analyzes the form, added data (variable data), and printing settings such as printing attributes specified by the user, and determines whether or not to print clear toner.

If the library 225 has determined not to print clear toner (NO in step S801), the library 225 executes a normal printing process in step S802. In other words, a normal print job (PDL data) is generated and sent to the printer 113.

However, if the library 225 has determined to print clear toner (YES in step S801), in step S803, the library 225 generates a print job excluding the variable data and sends that print job to the printer 113. This print job is, referring to the exemplary form shown in FIG. 4, a print job in which only the fixed graphic 302 is printed (the first print job).

Next, in step S804, the library 225 generates a print job in which only the variable data is to be printed, and sends that print job to the printer 113. This print job is, referring to the exemplary form shown in FIG. 4, a print job in which the variable data to be loaded into the field 303 is printed (the second print job). This print job further contains printing settings for printing clear toner.

Then, in step S805, the printer 113 receives the print jobs generated in steps S803 and S804, and determines whether or not the print job excludes the variable data.

If the printer 113 has determined that the print job excludes the variable data (YES in step S805), in step S806, the printer 113 prints and outputs the print job generated in step S803.

However, if the printer 113 has determined that the print job does not exclude the variable data (NO in step S805), in step S807, the printer 113 stores the print job generated in step S804 in the memory of the printer 113.

Next, the processing of the second print shall be described using FIG. 9. The processing illustrated in FIG. 9 is processing executed by the printer 113.

First, the user uses the operation panel of the printer 113 to select, from the print jobs stored in the printer 113 in advance, the print job he or she wishes to print. As a result, in step S901, the printer 113 determines whether or not the print job selected by the user is a print job that specifies the printing of clear toner (a clear toner print job).

Note that this determination is carried out based on whether or not the print job contains a printing setting for printing clear toner.

If it has been determined that the job is not a clear toner printing job (NO in step S901), the printer 113 executes normal printing in step S902.

However, if it has been determined that the job is a clear toner printing job (YES in step S901), in step S903, the printer 113 displays, in the operation panel of the printer 113, message text that is preset in the printer 113. The message displayed in the operation panel 702 shown in FIG. 7 is a specific example thereof.

Next, in step S904, the printer 113 resets parameters N, used internally, to 1. These parameters N indicate the number of the page to be printed.

Then, in step S905, the printer 113 determines whether or not to print the variable data during the printing processing of the Nth page.

If it has been determined that the variable data is to be printed (YES in step S905), the printer 113 prints the variable data in step S906. In other words, the processing performed in step S906 prints, for example, variable data onto a sheet in which only fixed graphics were printed during the initial printing and whose fields are therefore still blank. Note that this variable data is printed into the blank fields. Meanwhile, if it has been determined that the variable data is not to be printed (NO in step S905), the process advances to step S907.

Next, in step S907, the printer 113 prints the clear toner in the printing processing of the Nth page.

Then, in step S908, the printer 113 determines whether or not unprinted pages remain.

If it has been determined that unprinted pages remain (YES in step S908), the printer 113 increments N by 1 in step S909, and the process returns to step S905. However, if it has been determined that no unprinted pages remain (NO in step S908), the process ends.

As described thus far, according to the first embodiment, it is possible to add clear toner without printing sensitive personal information during the initial print. In other words, it is possible to perform printing using clear toner in a safe manner, without provoking the leaking of sensitive information.

Note that the first embodiment describes a configuration in which not all of the variable data is printed during the initial print, but all of the variable data (data groups) is printed during the second print. Here, if all of the variable data is to be printed during the second print, a large burden is placed on the system during the second print. Originally, the only variable data that should not be printed during the initial print is specific sensitive data, such as personal information.

Accordingly, a configuration in which only specific variable data is to be printed during the second print is also possible. An example thereof shall be described using FIG. 10.

FIG. 10 is a diagram illustrating an example of the application of the first embodiment of the present invention.

FIG. 10 is an example of a method that sets flags in specific fields indicating whether or not to print those fields during the initial print (that is, whether or not printing is permitted).

In FIG. 10, 1001 is a form creation window, generated by the form creation application 121, that is displayed in the display 144 of the host computer 101. First, when a user creates a form using the form creation window, he or she selects a field in which sensitive variable data is to be set, and configures the properties of that field. The example shown in FIG. 10 shows a state in which a field 2 is selected.

Next, the form creation application 121 displays a properties dialog 1002 of the field 2 based on operations made through the form creation window. Here, by checking a checkbox 1003, the user can execute printing settings whereby only the variable data set in this field is prohibited from being printed during the initial print. When the settings finish (that is, when an "OK" button is operated), a print job containing those printing settings is generated.

FIG. 11 illustrates an example of operations using a form 1004 illustrated in FIG. 10 according to the first embodiment of the present invention.

When printing, the variable data set in fields 1102 and 1104 is printed during the initial print. However, variable data 1105 in a field 1103, for which a flag has been set, is not printed, and is instead held in a hard disk within the printer. This variable data 1105 is then printed during the second print. Note that the field 1103 may be printed in the initial print or the second print.

Second Embodiment

In the first embodiment, it is necessary, when performing the second print, for the user to set the printed material, for which the initial print has finished, in the printer with the proper orientation and in the proper order. For this reason, there are cases where the correct output (printing) results cannot be obtained if the user has set the printed material in an incorrect manner. Accordingly, the second embodiment describes a configuration for eliminating operational mistakes on the part of the user.

In the second embodiment, the paper type is automatically set and associated with a discharge unit for printing medium at the time of the initial print, thereby realizing a configuration for eliminating operational mistakes on the part of the user.

Hereinafter, the configuration of the second embodiment shall be described using FIGS. 12 and 13.

Figure 12:
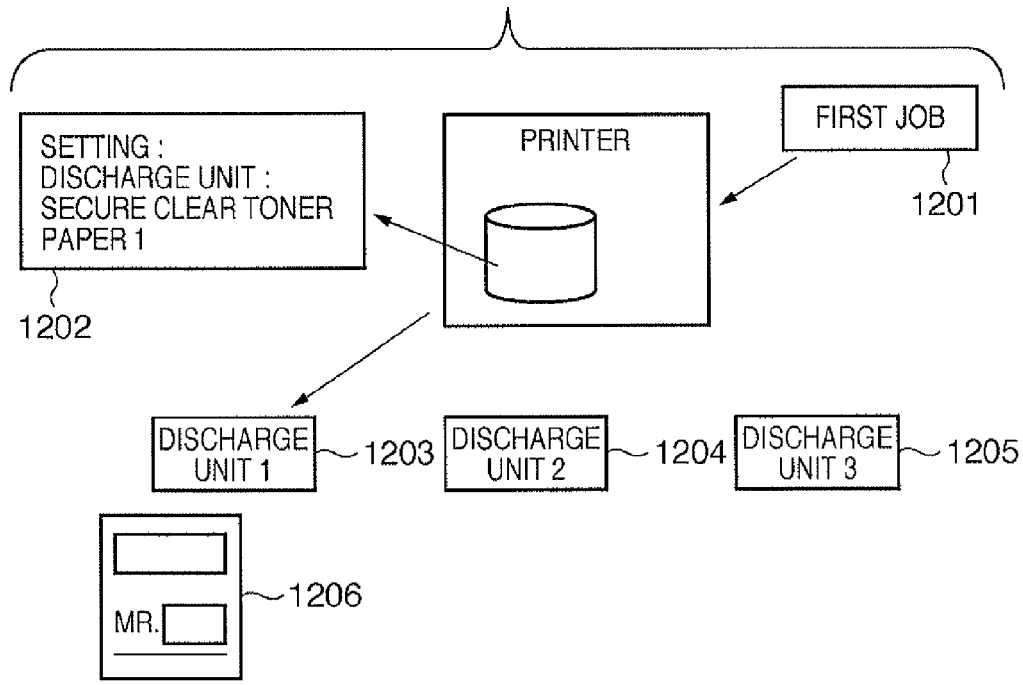
FIG. 12 is a diagram illustrating an example of procedures performed during the initial print according to a second embodiment of the present invention.

FIG. 12 is a diagram illustrating an example of procedures performed during the initial print according to the second embodiment of the present invention.

Upon receiving the initial (the first) print job, the printer outputs a printed material 1206 that does not include variable data to a specific discharge unit 1203, from among multiple discharge units 1203 to 1205. Then, the printer automatically sets the paper type for that discharge unit 1203. "Paper type" refers to a function for associating a supply cassette with paper.

Note that the discharge units 1203 to 1205 function as supply/discharge units that are also capable of supplying paper to the printer.

In the example in FIG. 12, a paper type "secure clear toner paper 1" is set for a discharge unit 1 (1202). The printer stores setting information including that paper type in a hard disk along with a print job containing only variable data.

Figure 13:
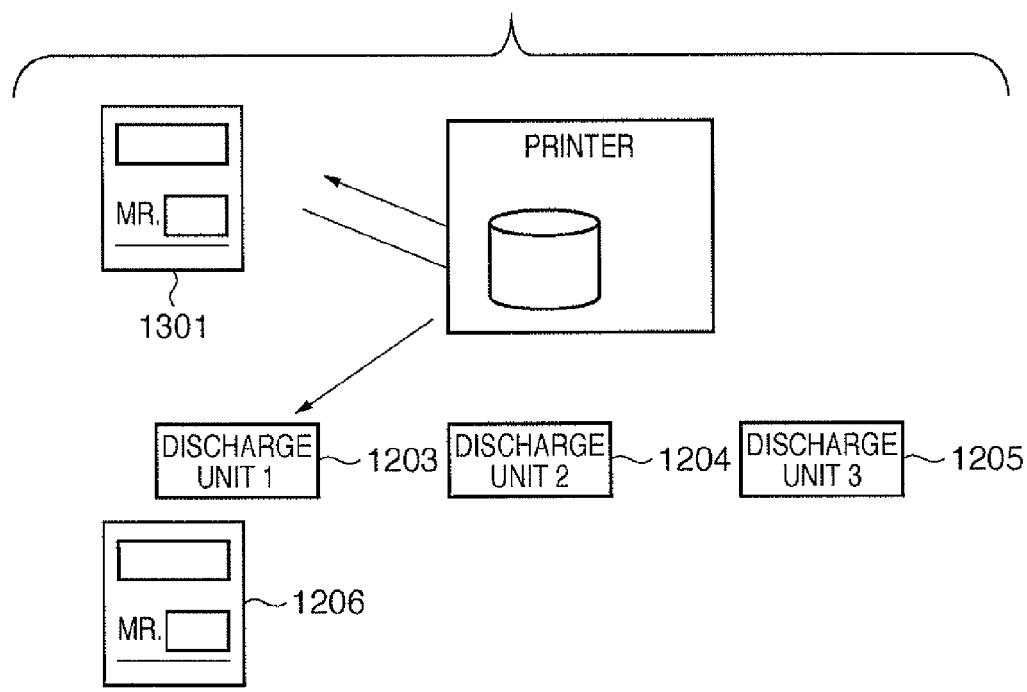
FIG. 13 is a diagram illustrating an example of procedures performed during the second print according to the second embodiment of the present invention.

FIG. 13 is a diagram illustrating an example of procedures performed during the second print according to the second embodiment of the present invention.

When the user selects a job using the operation panel of the printer, the printer analyzes the paper type setting information already stored in the hard disk. The paper is then loaded from the supply cassette corresponding to that paper type.

In the example in FIG. 13, the paper that was discharged to the discharge unit 1 is then supplied from the discharge unit 1 (1203). After that, the printer prints the variable data and clear toner onto the supplied paper, and outputs the result (1301). With this method, it is no longer necessary for the user to set paper when carrying out the second print; the printed material resulting from the first print is automatically selected. Operational mistakes on the part of the user are therefore eliminated.

As described thus far, according to the second embodiment, when printing using clear toner, the printed material resulting from the initial print is discharged to a specific discharge unit, and the printed material discharged to that specific discharge unit is then supplied for the second print.

In this manner, the supply/discharge units used in the supply/discharge for the series of prints, or in other words, the initial and second prints, can be integrated into a common unit. This allows the supplying of paper for the second print to be automated, which in turn makes it possible to reduce the operational burden for printing, avoid operational mistakes, and furthermore reduce the danger of information in the printed material being leaked.

Third Embodiment

The third embodiment describes a configuration that, like the second embodiment, eliminates operational mistakes on the part of the user. In the second embodiment, a dedicated discharge unit is necessary for each user, meaning that time and effort is necessary for the preparation thereof. The third embodiment describes a different configuration for eliminating operational mistakes on the part of the user.

In particular, in the third embodiment, a preview screen illustrating the correct printing results and a preview screen illustrating the actual result of printing using the printing paper that is set (a comparative display) are displayed in the operation panel of the printer during the second print. By comparing these preview screens, the user can confirm, prior to output, whether or not the printing paper is properly set.

FIG. 14 is a diagram illustrating an example according to the third embodiment of the present invention.

A preview screen is displayed in an operation panel 1401 of the printer during the second print. "Correct results" (1402) within the preview screen displays the correct printing results. This display is realized by the printer internally executing a process that overlays a form image indicating form information with a data image indicating data information from the initial print and storing, in advance, the image obtained thereby as an overlay image. Meanwhile, the "actual print" (1403) display is realized by displaying the printing results that would be obtained by printing variable data (data information) stored in the printer onto the printing paper set during the second print (where the fixed portions have already been printed).

By comparing these preview screens, the user can confirm, prior to output, whether or not the printing paper is properly set.

As described thus far, according to the third embodiment, a comparative display of the correct printing results and the actual printing results is displayed in the operation panel prior to printing, and the content thereof can be confirmed; therefore, whether the intended correct printing results will be obtained can be easily confirmed.

Fourth Embodiment

The same results as described in the first embodiment can be obtained even if the first and second prints are performed by different printing devices in order to improve the efficiency of the printing process, such as, for example, using offset printing for the first print, and printing clear toner using a POD (Print on Demand) device in the second print.

Fifth Embodiment

Although the first through fourth embodiments describe printing according to a laser beam system that uses toner as its recording agent, the present invention is not limited thereto. It goes without saying that the present invention can be applied to any inkjet printing system, thermal transfer printing system, or similar system that uses ink, as long as the ink used thereby is capable of realizing the same function as clear toner.

Furthermore, although printing using clear toner has been described as an example, the present invention is not limited thereto. For example, it goes without saying that the present invention can also be applied to a processing agent that is printed on (added to) a printing medium in order to strengthen the fix, water resistance, or the like of a recorded image, increase the image quality thereof, and the like.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-285708 filed on Nov. 6, 2008, which is hereby incorporated by reference herein in its entirety.

What is claimed is:

1. An information processing apparatus that generates print jobs to be supplied to a printing apparatus, the information processing apparatus comprising:
a display unit constructed to display a form image including a plurality of fields;
a selection unit constructed to select a field from the form image;
a property display unit constructed to display a property screen for a field selected by the selection unit, wherein said property screen accepts a setting for not printing data in clear toner printing;
an exclusion unit constructed to exclude first variable data to be inserted in the selected field from print data for overlay printing containing form information and first and second variable data, when the setting is accepted;
a first generation unit constructed to generate a first print job based on the print data for which the first variable data is excluded;
a first transmission unit constructed to transmit the first print job to the printing apparatus;
a second generation unit constructed to generate a second print job based on the first variable data and printing settings for printing clear toner; and
a second transmission unit constructed to transmit the second print job to the printing apparatus after the first print job is transmitted.

2. A control method for an information processing apparatus that generates print jobs to be supplied to a printing apparatus, the method comprising the steps of:
displaying a form image including a plurality of fields;
selecting a field from the form image;
displaying a property screen for a field selected in the selecting step,
wherein said property screen accepts a setting for not printing data in clear toner printing;
excluding first variable data to be inserted in the selected field from print data for overlay printing containing form information and first and second variable data, when the setting is accepted;
transmitting the first print job to the printing apparatus;
generating a second print job based on the first variable data and printing settings for printing clear toner; and
transmitting the second job to the printing apparatus after the first print job is transmitted.

3. A non-transitory computer-readable medium storing a computer-readable program, for causing a computer to execute control of an information processing apparatus that generates a print job to be supplied to a printing apparatus, the program causing the computer to execute the steps of:
displaying a form image including a plurality of fields;
selecting a field from the form image;
displaying a property screen for a field selected in the selecting step,
wherein said property screen accepts a setting for not printing data in clear toner printing;
excluding first variable data to be inserted in the selected field from print data for overlay printing containing form information and first and second variable data, when the setting is accepted;
transmitting the first print job to the printing apparatus;
generating a second print job based on the first variable data and printing settings for printing clear toner; and
transmitting the second job to the printing apparatus after the first print job is transmitted.

* * * * *